Nov. 3, 1953 H. P. KUPIEC ET AL 2,657,883
NOSE WHEEL STEERING SYSTEM FOR AIRCRAFT
Filed June 21, 1951 4 Sheets-Sheet 1
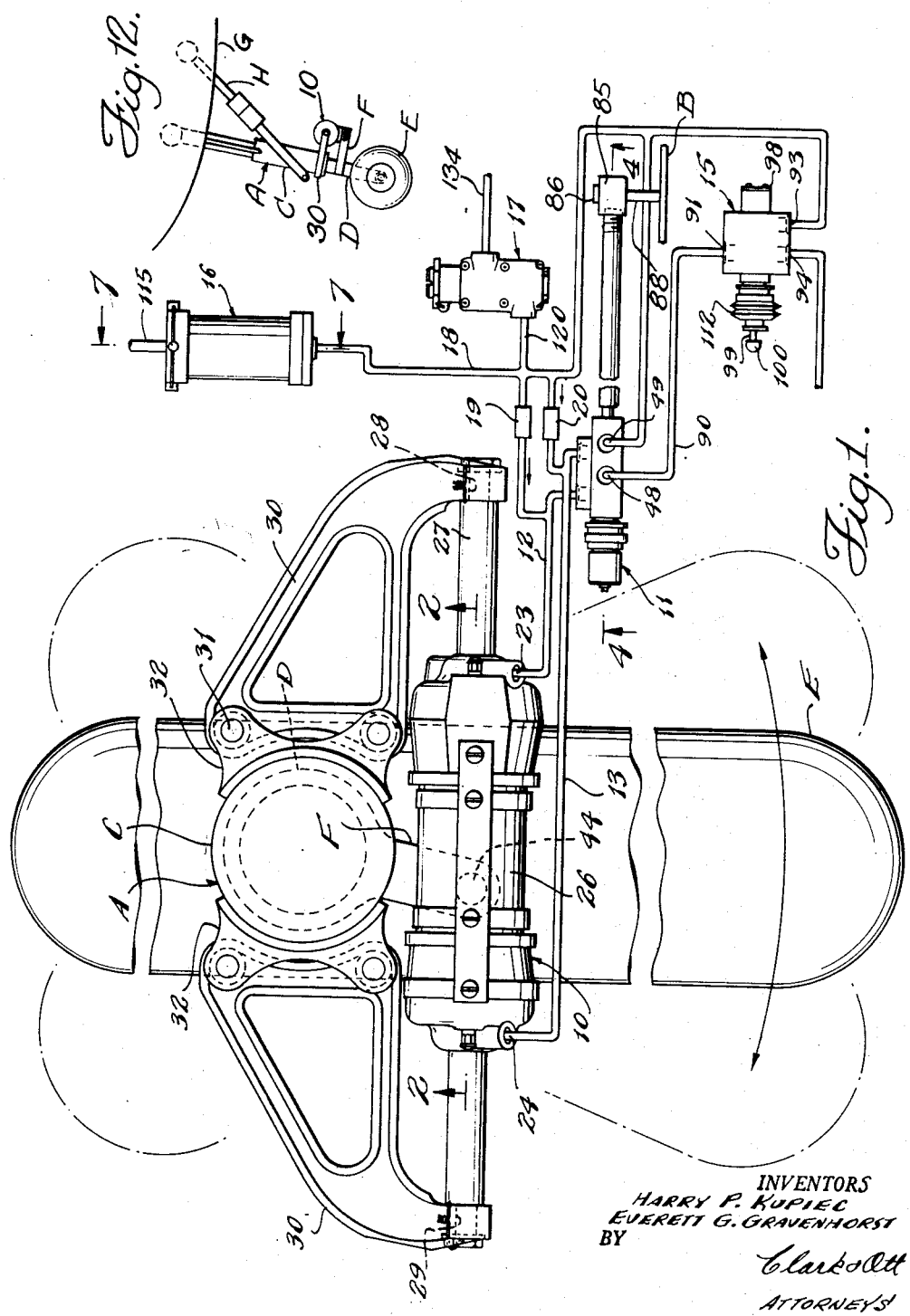
INVENTORS
HARRY P. KUPIEC
EVERETT G. GRAVENHORST
BY
Clark Ott
ATTORNEYS

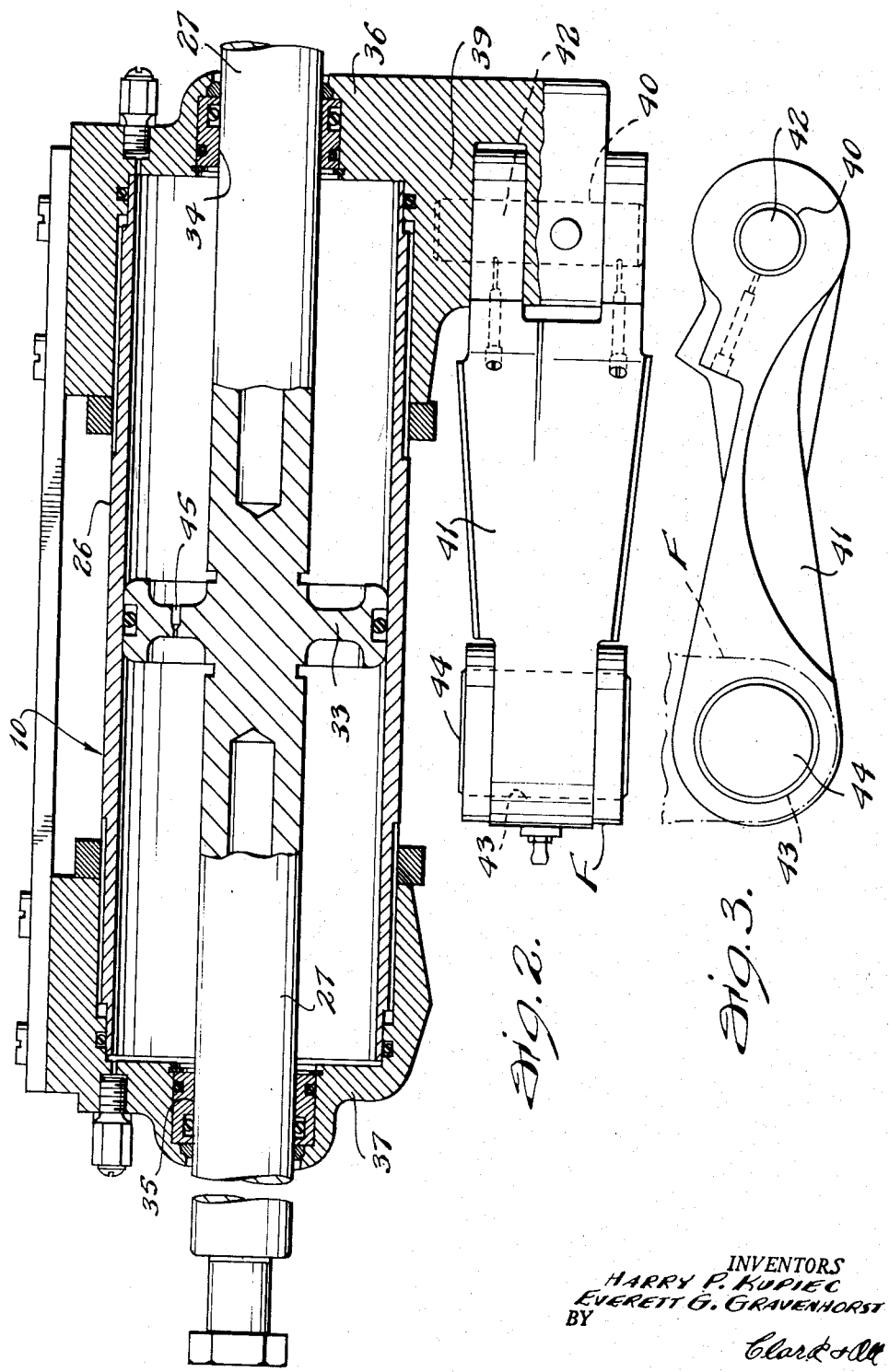

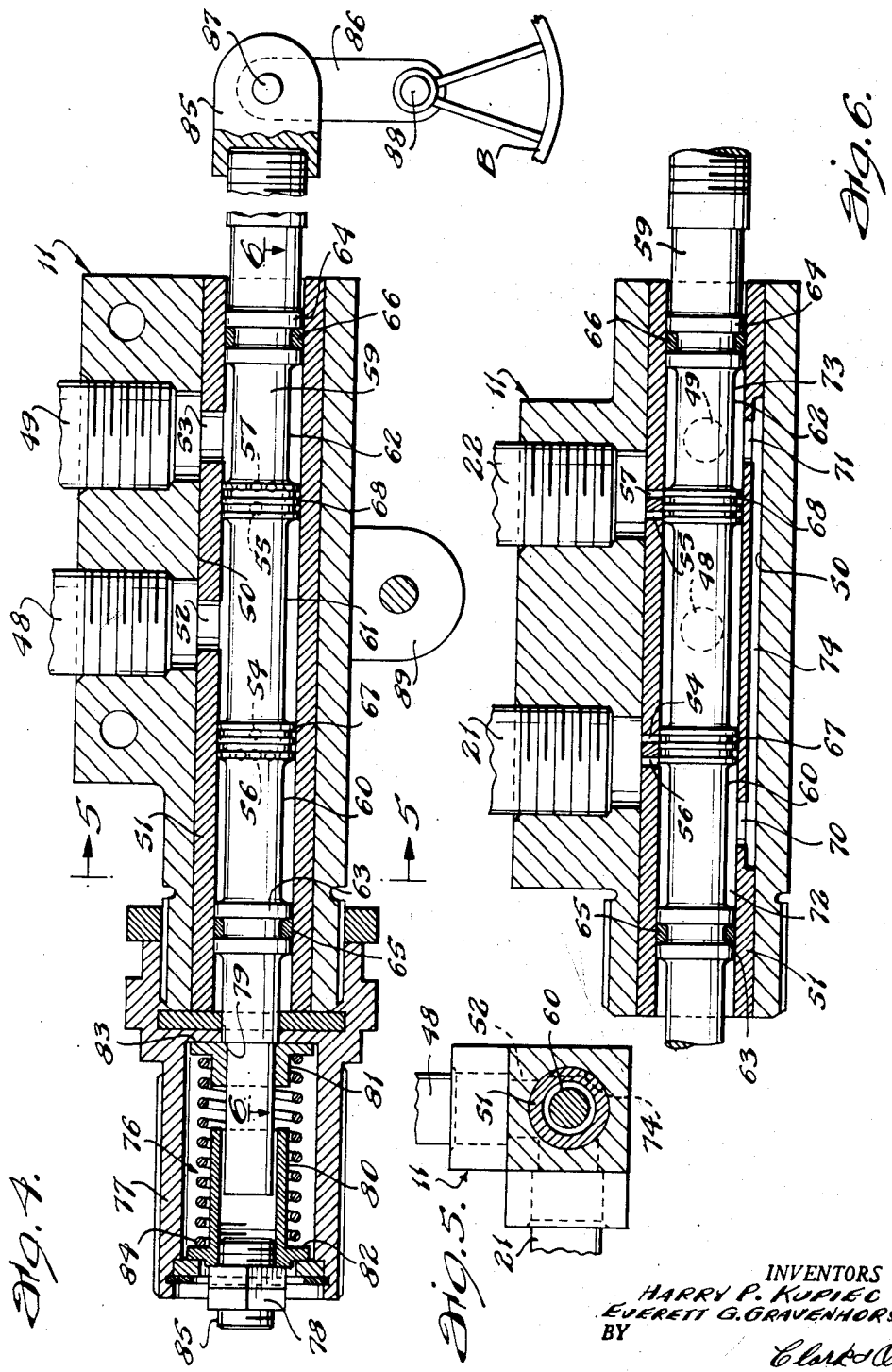

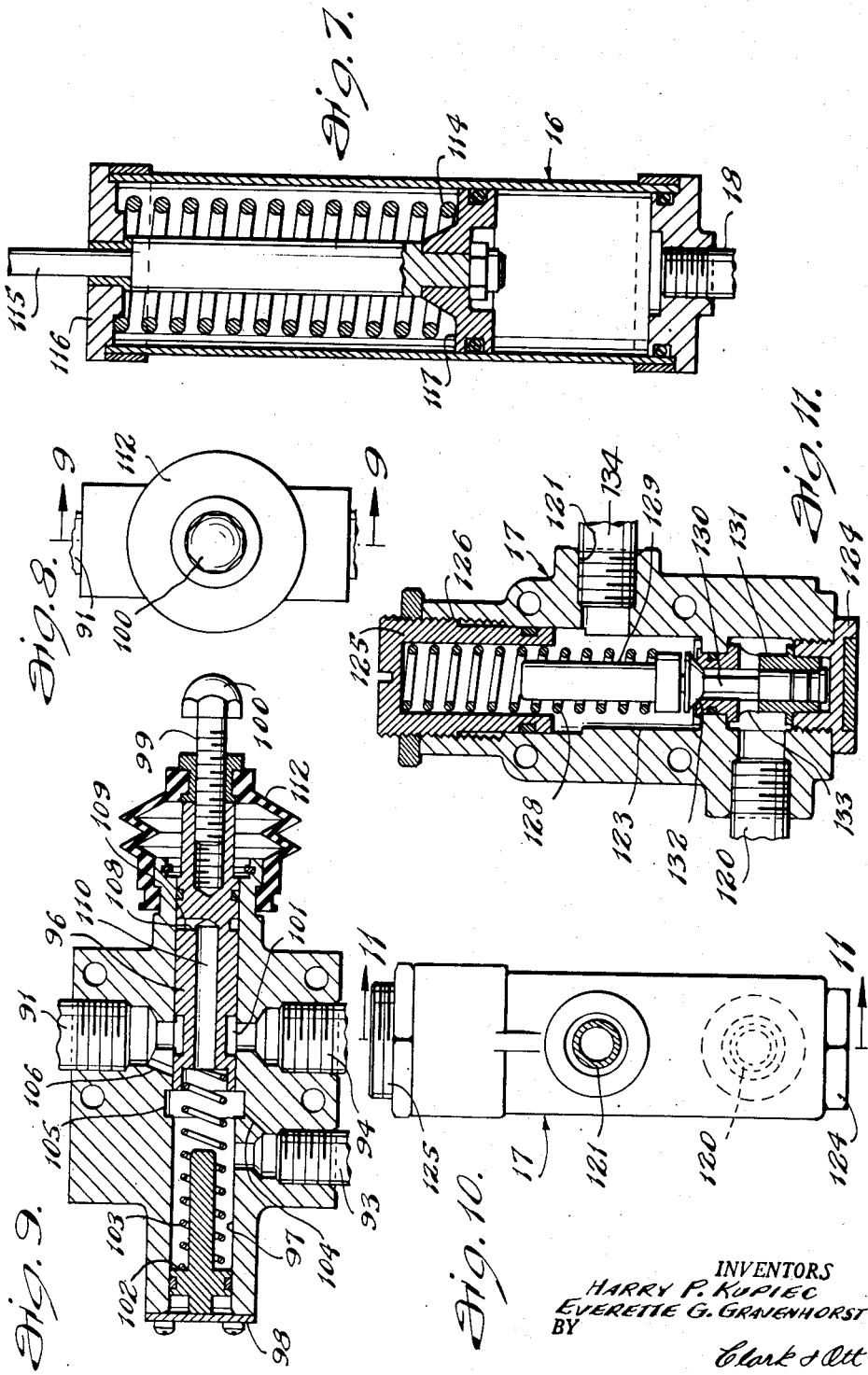

Patented Nov. 3, 1953

2,657,883

UNITED STATES PATENT OFFICE 2,657,883

NOSE WHEEL STEERING SYSTEM FOR AIRCRAFT

Harry P. Kupiec, Paramus, and Everett G. Gravenhorst, Hasbrouck Heights, N. J., assignors to Air Associates, Inc., Teterboro, N. J., a corporation of New Jersey Application June 21, 1951, Serial No. 232,838

7 Claims. (Cl. 244—50)

This invention relates to an hydraulic system for turning the nose wheel of aircraft for directing the aircraft when traveling on land.

The invention is directed to an hydraulic system in which a reciprocatory pressure responsive device is operatively connected with the nose wheel steering axle of the aircraft and with a control valve arranged in the system for admitting hydraulic fluid to either end of the device for turning the steering axle in accordance with the movement of the steering wheel of the aircraft.

Another object of the invention is to provide an hydraulic system which is constructed and arranged to provide a slow turning movement of the nose wheel steering axle when the same is initially turned and a more rapid turning movement thereof after the initial movement.

Still another object of the invention is to provide an hydraulic system which reduces or dampens shimmying action of the nose wheel steering axle.

Still another object of the invention is to provide a system having means for shutting off the flow of the hydraulic fluid to the operational parts of the system when the nose wheel is out of engagement with the ground.

Another object of the invention is to provide an hydraulic system of said character in which the aircraft may be turned or manipulated on land by utilizing the power of the engines, the application of the brakes to the main wheels of the landing gear, the manipulation of the control surfaces of the aircraft or a combination of the use of these parts without employing the hydraulic system for moving the nose wheel. When turning or maneuvering the aircraft on land in this manner, the nose wheel will follow the turning of the aircraft and the pressure responsive device will move in accordance with the turning of the nose wheel. The movement of the pressure responsive device will increase the pressure of the hydraulic fluid in one end thereof and cause a reduction in the pressure of the hydraulic fluid in the opposite end. The increased pressure in one end of the pressure responsive device will produce a flow of the fluid from said end and in order to provide for the flow of fluid into the opposite end thereof, the present invention provides check valves interposed in the system between the fluid return line and the high pressure lines leading from the control valve to the opposite ends of the pressure responsive device. By this arrangement, "voiding" in the reduced pressure end of the pressure responsive device is prevented under all conditions of steering of the aircraft while a nominal value of back pressure in the return line can be used.

Still another object of the invention is to provide a system of said character which operates on standard hydraulic pressure utilized in aircraft and the like and which will operate on pressures of 500 to 3,000 lbs. per square inch and which relieves the tension on the steering wheel and renders the same sensitive in operation.

With the foregoing and other objects in view, reference is now made to the following drawings and accompanying specification in which the preferred embodiment of the invention is illustrated.

In the drawings:

Fig. 1 is a diagrammatic view of an hydraulic system constructed in accordance with the invention.

Fig. 2 is an enlarged fragmentary sectional view of the steer cylinder and rod taken approximately on line 2—2 of Fig. 1.

Fig. 3 is a side view of the link pivotally connected with the cylinder.

Fig. 4 is an enlarged longitudinal sectional view of the steer valve taken approximately on line 4—4 of Fig. 1.

Fig. 5 is a cross-sectional view taken approximately on line 5—5 of Fig. 4.

Fig. 6 is a longitudinal sectional view taken approximately on line 6—6 of Fig. 4.

Fig. 7 is an enlarged sectional view through the accumulator, taken approximately on line 7—7 of Fig. 1.

Fig. 8 is an end view of the shut-off valve.

Fig. 9 is an enlarged longitudinal sectional view taken approximately on line 9—9 of Fig. 8.

Fig. 10 is a side view of the relief valve.

Fig. 11 is an enlarged longitudinal sectional view taken approximately on line 11—11 of Fig. 10.

Fig. 12 is a schematic side view of a nose wheel column in extended position on an aircraft and showing the location of the pressure responsive device for turning the nose wheel.

Referring to the drawings by characters of reference, the system includes an hydraulic pressure responsive device 10 operatively connected with the nose wheel column A of an aircraft and the like for turning the nose wheel E for maneuvering the aircraft on land, a control valve 11 operatively connected with the steering wheel B of the aircraft for admitting hydraulic fluid to the pressure responsive device through conduits 12 and 13 in response to the movement of the steering wheel, a shut-off valve 15 for shutting off hydraulic fluid to the system when the nose wheel is elevated, an accumulator 16 and a relief valve 17 connected in the system with the return or low pressure conduit 18, and two check valves 19 and 20 connected in the system between the low pressure conduit 18 and the conduits 12 and 13 respectively. The conduits 12 and 13 are respectively connected with service ports 21 and 22 of the control valve and with the ports 23 and 24 at the opposite ends of the pressure responsive device 10.

The pressure responsive device 10 consists of a reciprocatory cylinder 26 which is mounted for longitudinal reciprocatory movement on a rod 27 fixed at its ends in apertures 28 and 29 respectively in oppositely disposed brackets 30. The said brackets are secured by bolts 31 to brackets 32 affixed to the fixed upper portion C of the nose wheel column of the aircraft to dispose the rod 27 in horizontal relation. The rod 27 is formed with a head 33 located medially thereof which snugly fits the inner periphery of the cylinder 26 while the opposite ends of the rod snugly protrude through openings 34 and 35 in the end walls 36 and 37 of the cylinder for sliding movement of the cylinder on the rod. The ports 23 and 24 are formed in the end walls of the cylinder for admitting hydraulic fluid to either end thereof on opposite sides of the head 33 for movement of the cylinder in either direction longitudinally of said rod. The end wall 36 of the cylinder is formed with a slotted depending portion 39 for receiving the bifurcated end of a link 41 pivoted on a bearing pin 42 disposed in aligned openings 40. The link 41 is arranged for swinging movement in a plane disposed in parallel relation with the longitudinal axis of the cylinder and is provided with a bearing opening 43 in which is pivoted the vertical pin 44 of a bracket F affixed to the lower portion D of the nose wheel column. The said lower portion D of the nose wheel column constitutes the steering axle of the nose wheel E and is supported for turning movement in the lower end of the upper portion C of the nose wheel column affixed in any desired manner, such as by the struts H to the aircraft indicated generally by the reference character G. The head 33 is provided with an opening 45 which is of a size to permit of the gradual flow of fluid from the high pressure side of the head to the low pressure side thereof for a purpose to be hereinafter described.

The control valve 11 is also provided with pressure and return ports 48 and 49, which together with the service ports 21 and 22 open into a longitudinally extending steel sleeve 51 tightly fitting and extending the full length of the bore 50 of the valve body. The sleeve 51 is provided with openings 52 and 53 disposed in registry with the pressure and return ports 48 and 49 and in right angular relation to said openings 52 and 53 the sleeve is formed with small openings 54 and 55 disposed in registry with the service ports 21 and 22 respectively. Adjacent said openings 54 and 55 the said sleeve is formed with a plurality of transversely aligned relatively small openings 56 and 57 disposed in registry with the service ports 21 and 22 respectively, the openings 56 being disposed to the left of the openings 54 and the openings 57 being disposed to the right of the openings 55 as shown in Figs. 5 and 6 of the drawings.

A plunger 59 is mounted for longitudinal reciprocatory movement in the sleeve for regulating the flow of the hydraulic fluid from the fluid pressure port 48 in either direction through said service ports 21 and 22 and to the cylinder 26 through the conduits 12 and 13 and the discharge of the return flow through the return port 49. For this purpose, the plunger 59 is cut away or reduced in diameter at longitudinally spaced portions 60, 61 and 62 providing circumferential lands 63 and 64 which are provided with packing rings 65 and 66 to prevent the flow of fluid between the said lands and the inner periphery of the sleeve 51. The said reduced portions also provide circumferential lands 67 and 68 disposed in spaced relation between the lands 63 and 64 and which are adapted to regulate the flow of the hydraulic fluid through the openings 54 and 56 leading to the service port 21 and through the openings 55 and 57 leading to the service port 22. The sleeve 51 is provided with openings 70 and 71 which communicate with the annular recesses 72 and 73 respectively provided by the reduced portions 60 and 62 of the plunger and which also communicate with a longitudinally extending slot 74 formed in the outer periphery of the sleeve whereby the hydraulic fluid from the service port 21 is discharged through the opening 70, slot 74, opening 71 and thence through the return port 49 while the hydraulic fluid from the service port 22 flows directly from the annular recess 73 through the return port 49.

The plunger 59 is provided with a tensioning device indicated generally by the refernce character 76 which normally retains the plunger in position with the lands 67 and 68 disposed in partially covering relation with the openings 54 and 55. The tensioning device 76 includes a housing 77 affixed to one end of the control valve with one end of the plunger projecting into said housing. Located within the housing 77 are flanged tubular members 80 and 81 arranged on the plunger 59 with the flanges 82 and 83 thereof respectively disposed against the outer end of the housing and against a shoulder 79 located at the inner end of the reduced portion of the plunger. A coiled contractile spring 84 is interposed between said flanges which spring tensions the plunger to normally dispose the lands 67 and 68 in partially covering relation with said openings as hereinbefore set forth. A lock nut 78 arranged on a threaded stud 85 is adapted to provide the desired tension of the spring 84.

The plunger 59 protrudes through the control valve 11 at the opposite end from the tensioning device and mounted on the protruding end thereof is a bifurcated extension 85 between the furcations of which a link 86 is pivoted on the pivot pin 87. The link 86 is affixed at its opposite end to the steering column 88 of the steering wheel B whereby the steering wheel may be turned in one direction to move the plunger so as to permit of the flow of the fluid through the pressure port 21 with the return flowing through the pressure port 22, and may be turned in the opposite direction to move the plunger so as to permit of the flow of the fluid through the pressure port 22 and the return flow through the pressure port 21. The valve 11 is provided with an apertured lug 89 for mounting the same on a fixed part of the aircraft for pivotal swinging movement on a pin extending through the apertured lug to permit of rocking movement of the valve with the arcuate movement of the lever 86 about the steering column 88.

The control valve 11 is connected with the shut-off valve 15 by a fluid pressure conduit 90 leading from the pressure outlet port 91 of the shut-off valve to the pressure port 48 of the control valve. The return port 49 of the control valve is connected with the low pressure conduit 18 by a conduit 92 and with the return port 93 of the shut-off valve. The shut-off valve is provided with a pressure port 94 which is connected in the system with a pressure pump (not shown).

The shut-off valve 15 is provided with a plunger 96 mounted for reciprocatory movement in a longitudinally extending bore 97 opening through the opposite ends thereof and which is closed at one end by a plate 98 with the plunger 96 protruding through the opposite end and having a headed stud 99 threadedly engaged in the protruding end for adjusting the head 100 toward and away from the end of the plunger. The said plunger is formed with a cylindrical recess 101 which is normally disposed in registry with the pressure outlet port 91 and the pressure supply port 94 by means of a coil spring 102 tensioned between the inner end of the plunger and a flanged stem 103 fitted in the bore 97 in abutting engagement with the plate 98. The said valve is formed with a duct 104 extending diagonally from the return port 93 to a recess 105 formed in the periphery of the bore 97 at the inner end of the plunger 96. The said valve is also formed with a duct 106 extending diagonally from the outlet port 91 to the bore 97 and which is normally closed by the plunger 96. The valve is so located that the headed end 100 is adapted to be engaged by the nose wheel or supporting part when the nose wheel is out of engagement with the ground to thereby cam the plunger 96 inwardly against the tension of the spring 102 to move the recessed portion 101 thereof into registry with the duct 106 and recess 105 to shut off the pressure supply port 94 and the outlet port 91 whereby the pressure supply of the hydraulic fluid is shut off to the system while the outlet port 91 is open to the return port 93.

The plunger 96 of the shut-off valve 15 is formed with a peripheral recess 108 which communicates through an opening 109 in the plunger with a longitudinally extending bore 110 opening through the inner end thereof. By this construction fluid flowing from the recess 101 between the bore 97 and the periphery of the plunger 96 escapes through the recess 108 and thence into the bore 110 and is discharged through the duct 104 and return 93. A flexible rubber bellows 112 is secured at its inner end in surrounding relation with the outer end of the body of the valve and the outer end of the plunger as illustrated in Fig. 8 of the drawings.

The accumulator 16 may be of any desired type such as a spring loaded type provided with a coil spring 114 interposed in surrounding relation with the guide rod 115 and tensioned against the upper end 116 of the accumulator and the piston head 117 secured to the lower end of the guide rod.

The relief valve 17 is of a type adapted to be set to provide the desired pressure in the return conduit 18 such as 200 pounds per square inch when utilizing a pressure of 1,500 pounds per square inch in the fluid pressure conduit 90. The relief valve 17 is provided with a pressure port 120 and a return port 121 which ports communicate with a bore 123 extending longitudinally of said valve. The bore 123 is closed at its lower end by a plug 124 and at its upper end by a screw cap 125 which is threadedly engaged in the threaded opening 126 in the upper end of the valve for regulating the pressure of the coil spring 128 against the piston 129. The piston 129 bears against a poppet 130 which is mounted for reciprocatory movement in a sleeve 131 fitted at its lower end in the plug 124. The sleeve 131 is formed with a plurality of circumferentially spaced openings 133 for admitting fluid from the pressure port 120 into the passageway in said sleeve. The upper end of the sleeve forms a valve seat for the conical upper end portion 132 of the poppet for shutting off the flow of fluid from the pressure port 120 to the return port 121. The return port 121 is connected by a conduit 134 with the low pressure side of the pressure pump (not shown).

When the aircraft is on the ground both ends of the cylinder 26 of the pressure responsive device 10 are open to the low pressure conduit 18 through the control valve 11. Turning the steering wheel B in a clockwise direction opens the service port 22 to the flow of fluid from the pressure supply conduit 90 to the left hand end of the cylinder for movement thereof to the right to thereby effect counterclockwise turning movement of the lower portion D of the nose wheel column with a consequent turning of the nose wheel. Turning of the steering wheel B as described also opens the service port 21 to the low pressure conduit 18 for the flow of fluid from the right hand end of the cylinder to the return conduit 18. Turning of the steering wheel B in a counterclockwise direction similarly effects turning of the lower portion D of the nose wheel column in a clockwise direction with a consequent turning of the nose wheel.

The initial turning movement of the steering wheel B functions to open the small openings 54 and 55 which permits of the flow of a small quantity of the fluid through the service ports. This imparts a slow initial movement of the cylinder and consequently a slow initial movement of the nose wheel. Further turning of the steering wheel B moves the lands 67 and 68 to fully open the series of openings 56 and 57. This functions to permit of the full flow of the fluid to and from the cylinder to thereby impart a more rapid turning movement to the nose wheel.

The restricted opening 46 in the head 33 of the pressure responsive device 10 permits of the flow of fluid from the high pressure side of the head to the low pressure side thereof. This functions to produce a cushioning action or a smooth acceleration of the cylinder to thereby dampen or retard shimmying action of the nose wheel.

The check valve 20 is arranged to permit of the flow of fluid from the low pressure conduit 18 through the conduit 13 and to the left hand end of the cylinder 26 when the cylinder is moved to the left by the turning of the nose wheel E by the use of the engines of the aircraft, the application of the brakes to the main wheels of the landing gear thereof, the manipulation of the control surfaces or a combination of the use of these parts. When turning or maneuvering the aircraft on land in this manner, without the application of hydraulic pressure in the system, the nose wheel will follow the turning of the aircraft and the cylinder 26 will move with the turning of the nose wheel. This movement of the cylinder to the left will increase the pressure of the fluid in the right hand end of the cylinder with a consequent reduction of the pressure in the left hand end thereof. The increased pressure in the right hand end of the cylinder will force fluid to flow from said end and through the control valve 11 to the low pressure conduit 18. Since the opening 55 in the control valve 11 is relatively small, the same will not permit of sufficient flow of fluid into the left hand end of the cylinder to fill up the space therein due to the movement of the cylinder to the left. The check valve 20 is provided for this purpose which permits of the flow of fluid from the low pressure conduit 18 to the left hand end of the cylinder. This prevents "voiding" of the fluid in the left hand end thereof while maintaining a normal pressure such as 200 pounds per square inch in the low pressure conduit 18 and at the same time utilizing a pressure of 1,500 pounds per square inch in the pressure supply line. The check valve 19 functions similarly to permit of the flow of fluid from the low pressure conduit 18 to the right hand end of the cylinder when the cylinder is moved to the right by the turning of the nose wheel by other means than the hydraulic system.

There is thus provided an hydraulic system by which the nose wheel may be turned for directing the aircraft when traveling on land and which system permits of the turning of the aircraft on land by its own power and the manipulation of its controls without the use of the hydraulic pressure and without the build-up of excessive pressure in the hydraulic system.

It is to be understood that the conduits 12 and 13 connected between the cylinder 26 and the control valve 11 are flexible to permit of reciprocatory movement of the cylinder 26 and swinging movement of the control valve 11 on the pivotal connection extending through the apertured lug 89. The conduits 90 and 92 are also flexible to permit of the pivotal swinging of the control valve 11.

What is claimed is:

1. In an hydraulic system for turning the guiding wheel of an aircraft for turning the aircraft when traveling on land, an upwardly extending column including an upper portion affixed to the aircraft and a lower portion supported by the upper portion for turning movement and on which the guiding wheel is mounted, a pressure responsive device including a reciprocatory cylinder, a rod affixed to the upper portion of said column and having a head, said cylinder being mounted on said rod for reciprocatory movement thereon and with the head located within the cylinder, a link pivotally connected to said cylinder and pivotally connected to the lower portion of said column for turning the same with the movement of the cylinder, a valve in said system connected with a high pressure supply conduit and a low pressure return conduit and with two service conduits extending from said valve to and opening into the ends of the cylinder, a plunger mounted for reciprocatory movement in said valve, a steering member, and means operatively connecting said steering member to said plunger for moving the plunger to thereby open said valve for the flow of hydraulic fluid from the valve into one end of the cylinder and the flow of hydraulic fluid from the other end of the cylinder through said valve for imparting movement to the cylinder.

2. In an hydraulic system for turning the guiding wheel of an aircraft for turning the aircraft when traveling on land, an upwardly extending column including an upper portion affixed to the aircraft and a lower portion supported by the upper portion for turning movement and on which the guiding wheel is mounted, a pressure responsive device including a reciprocatory cylinder, a rod affixed to the upper portion of said column and having a head, said cylinder being mounted on said rod for reciprocatory movement thereon and with the head located within the cylinder, a link pivotally connected to said cylinder and pivotally connected to the lower portion of said column for turning the same with the movement of the cylinder, a valve in said system having ports connected with a high pressure supply conduit and a low pressure return conduit and two service ports connected with service conduits extending to and opening into the ends of the cylinder, a plunger mounted for reciprocatory movement in said valve, means tensioning said plunger for resiliently maintaining the same with the service ports in partially open relation, a steering member, means operatively connecting said steering member to said plunger for moving the plunger to thereby open said valve for the flow of hydraulic fluid from the high pressure supply conduit into one end of the cylinder and the flow of hydraulic fluid from the other end of the cylinder through said valve and into the return conduit, and check valves arranged in by-pass conduits extending from said low pressure return conduit to said service conduits respectively to permit of the flow of fluid from the low pressure return conduit to either end of the cylinder to compensate for the movement of the cylinder when the aircraft is moved on land without the use of the hydraulic system.

3. In an hydraulic system for turning the guiding wheel of an aircraft for turning the aircraft when traveling on land, an upwardly extending column including an upper portion affixed to the aircraft and a lower portion supported by the upper portion for turning movement and on which the guiding wheel is mounted, a pressure responsive device including a reciprocatory cylinder, a rod affixed to the upper portion of said column and having a head, said cylinder being mounted on said rod for reciprocatory movement thereon and with the head located within the cylinder, a link pivotally connected to said cylinder and pivotally connected to the lower portion of said column for turning the same with the movement of the cylinder, a valve in said system having ports connected with a high pressure supply conduit and a low pressure return conduit and two service ports connected with service conduits extending to and opening into the ends of the cylinder, a plunger mounted for reciprocatory movement in said valve, means tensioning said plunger for resiliently maintaining the same with the service ports in partially open relation, a steering member, means operatively connecting said steering member to said plunger for moving the plunger to thereby open said valve for the flow of hydraulic fluid from the high pressure supply conduit into one end of the cylinder and the flow of hydraulic fluid from the other end of the cylinder through said valve and into the return conduit, and check valves arranged in by-pass conduits extending from said low pressure return conduit to said service conduits respectively to permit of the flow of fluid from the low pressure return conduit to either end of the cylinder to compensate for the movement of said reciprocatory member when the aircraft is moved on land without the use of the hydraulic system.

4. In an hydraulic system for turning an aircraft when traveling on land, a guiding wheel mounted on a transverse axle, an upwardly extending column affixed to the aircraft for swivel turning movement, said transverse axle being mounted in the lower end of said column for turning movement therewith, a pressure responsive device including a reciprocatory cylinder, a link connected with said cylinder and said column for pivotal swinging movement for turning the column with the movement of the cylinder, a valve in said system connected with a high pressure supply conduit and a low pressure return conduit and with two service conduits extending from said valve to and opening into the ends of the cylinder, a plunger mounted for reciprocatory movement in said valve, a steering member, and means operatively connecting said steering member to said plunger for moving the plunger to thereby open said valve for the flow of hydraulic fluid from the valve into one end of the cylinder and the flow of hydraulic fluid from the other end of the cylinder through said valve for imparting movement to the cylinder.

5. In an hydraulic system for turning the guiding wheel of an aircraft for turning the aircraft when traveling on land, an upwardly extending column including an upper portion affixed to the aircraft and a lower portion supported by the upper portion for turning movement and on which the guiding wheel is mounted, a pressure responsive device including a reciprocatory cylinder, a rod affixed to the upper portion of said column and having a head, said cylinder being mounted on said rod for reciprocatory movement thereon and with the head located within the cylinder, a link pivotally connected to said cylinder and pivotally connected to the lower portion of said column for turning the same with the movement of the cylinder, a valve in said system having ports connected with a high pressure supply conduit and a low pressure return conduit and two service ports connected with service conduits extending to and opening into the ends of the cylinder, a plunger mounted for reciprocatory movement in said valve, means tensioning said plunger for resiliently maintaining the same with the service ports in partially open relation, a steering member, means operatively connecting said steering member to said plunger for moving the plunger to thereby open said valve for the flow of hydraulic fluid from the high pressure supply conduit into one end of the cylinder and the flow of hydraulic fluid from the other end of the cylinder through said valve and into the return conduit, a shut-off valve interposed in the high pressure supply conduit, said shut-off valve having a reciprocatory plunger for shutting off the flow of the fluid through the valve, means tensioning said plunger for normally maintaining the same with the valve in open relation, and said plunger protruding through one end of the valve and having a head adapted to be engaged by an operating part moving with the guiding wheel for moving the plunger inwardly to thereby shut off the flow of fluid when the guiding wheel is elevated from the ground.

6. In an hydraulic system for turning an aircraft when traveling on land, a guiding wheel mounted on a transverse axle, an upwardly extending column affixed to the aircraft for swivel turning movement, said transverse axle being mounted in the lower end of said column for turning movement therewith, a pressure responsive device including a reciprocatory cylinder, a link connected with said cylinder and said column for pivotal swinging movement for turning the column with the movement of the cylinder, a valve in said system connected with a high pressure supply conduit and a low pressure return conduit and with two service conduits extending from said valve to and opening into the ends of the cylinder, a plunger mounted for reciprocatory movement in said valve, a steering member, means operatively connecting said steering member to said plunger for moving the plunger to thereby open said valve for the flow of hydraulic fluid from the valve into one end of the cylinder and the flow of hydraulic fluid from the other end of the cylinder through said valve for imparting movement to the cylinder, a shut-off valve interposed in the high pressure supply conduit and having a plunger provided with a head protruding through one end of the valve and adapted to be engaged by an operating part moving with the guiding wheel for moving the plunger inwardly to thereby shut off the flow of fluid when the guiding wheel is elevated from the ground.

7. In an hydraulic system for turning an aircraft when traveling on land, a guiding wheel mounted on a transverse axle, an upwardly extending column affixed to the aircraft for swivel turning movement, said transverse axle being mounted in the lower end of said column for turning movement therewith, a pressure responsive device including a reciprocatory cylinder, a link connected with said cylinder and said column for pivotal swinging movement for turning the column with the movement of the cylinder, a valve in said system connected with a high pressure supply conduit and a low pressure return conduit and with two service conduits extending from said valve to and opening into the ends of the cylinder, a plunger mounted for reciprocatory movement in said valve, a steering member, means operatively connecting said steering member to said plunger for moving the plunger to thereby open said valve for the flow of hydraulic fluid from the valve into one end of the cylinder and the flow of hydraulic fluid from the other end of the cylinder through said valve for imparting movement to the cylinder, and check valves arranged in by-pass conduits extending from said low pressure return conduit to said service conduits respectively to permit of the flow of fluid from the low pressure return conduit to either end of the cylinder to compensate for the movement of the cylinder when the aircraft is moved on land without the use of the hydraulic system.

HARRY P. KUPIEC.
EVERETT G. GRAVENHORST.

References Cited in the file of this patent

UNITED STATES PATENTS

| Number | Name | Date |
|---|---|---|
| 548,289 | Bonner | Oct. 22, 1895 |
| 2,243,364 | Trautman | May 27, 1941 |
| 2,424,233 | Greenough | July 22, 1947 |
| 2,474,681 | Lane | June 28, 1949 |
| 2,506,093 | MacDuff | May 2, 1950 |
| 2,552,843 | Clifton | May 15, 1951 |
| 2,577,999 | Christensen | Dec. 11, 1951 |

FOREIGN PATENTS

| Number | Country | Date |
|---|---|---|
| 629,649 | France | Aug. 1, 1927 |